United States Patent [19]

Yamamoto

[11] Patent Number: 4,593,239
[45] Date of Patent: Jun. 3, 1986

[54] METHOD AND APPARATUS FOR CONTROLLING TRAVEL OF AN AUTOMATIC GUIDED VEHICLE

[75] Inventor: Kenzo Yamamoto, Osaka, Japan

[73] Assignee: Tsubakimoto Chain Co., Osaka, Japan

[21] Appl. No.: 647,995

[22] Filed: Sep. 6, 1984

[30] Foreign Application Priority Data

Sep. 17, 1983 [JP] Japan .................................. 58-171737

[51] Int. Cl.⁴ .............................................. G05D 1/00
[52] U.S. Cl. .................................... 318/587; 180/167; 180/169
[58] Field of Search ............... 318/587; 180/167, 168, 180/169

[56] References Cited

U.S. PATENT DOCUMENTS

| | | | |
|---|---|---|---|
| 3,738,443 | 6/1973 | Kubo | 318/603 |
| 4,284,160 | 8/1981 | De Liban et al. | 318/587 X |
| 4,310,789 | 1/1982 | Mank et al. | 318/587 |
| 4,500,970 | 2/1985 | Daemmer et al. | 318/587 |

*Primary Examiner*—B. Dobeck
*Attorney, Agent, or Firm*—Darby & Darby

[57] ABSTRACT

An automatic guided vehicle detects marks located on a plurality of points along a route it travels using at least three sensors, selects the number of marks detected from each individual sensor as a reference value in accordance with the logic of majority, and stops when the reference value agrees with a predetermined value. Cumulative errors, caused by misdetection are thus avoided and, there is little cumulative error. Thus, accurate control in long distance travel is possible.

5 Claims, 7 Drawing Figures

METHOD AND APPARATUS FOR CONTROLLING TRAVEL OF AN AUTOMATIC GUIDED VEHICLE

BACKGROUND OF THE INVENTION

1. Field of the Invention

The present invention relates to a method and an apparatus for controlling the travel of an automatic guided vehicle to make the automatic guided vehicle travel and stop at intended point.

2. Description of the Prior Art

Various methods have been proposed, and put to practical use, for causing an unmanned vehicle (automatic guided vehicle) to travel from place to place on a plant floor along a route composed of an optical reflective tape or the like, instead of a railed track. One typical known method of the type is illustrated in FIG. 1 by way of example. FIG. 1 is a schematic plan view showing a conventional method of controlling the travel of an automatic guided vehicle. As shown in FIG. 1, a route consists of a line of optical reflective tape R fixed on a floor surface in a loop-form pattern to connect between a start point O and a plurality of points A, B . . . in order. A plural of count marks CM, CM . . . composed of a similar reflective tape or the like are separately fixed on the floor at predetermined intervals along the route. An automatic guided vehicle 30, provided with sensors 31 and 32 for detecting reflective tape R as the route and count marks CM, CM . . . respectively, is allowed to run along the route by detecting the reflective tape R by sensor 31. Whilst, the sensor 32 counts the number of count marks CM, CM . . . passed by automatic guided vehicle 30; and each time such counted number reaches the number of count marks CM, CM . . . present over a distance from the start point O to each or any of the intended points A, B . . . , the automatic guided vehicle 30 is braked to selectively stop at each or any of the points A, B . . . .

Such control method has a difficulty in that if any obstacles resembling a count mark is present adjacent any point of the route or if any of the count mark CM is stained, some deviation may be caused to the numeric value of counting up to an intended point. Similarly, if an error is made in the counting of count marks CM, CM . . . because of some snaking or the like involved in the travel of the automatic guided vehicle 30 on the way to an intended point, the automatic guided vehicle 30 may stop at a point other than intended point. With errors accumulated, such deviation will naturally become larger as the distance of travel increases. In addition, execution of laying the count-mark requires considerable labor because a large number of count marks are involved.

OBJECT OF THE INVENTION

A first object of the present invention is to provide a method and apparatus for controlling travel of an automatic guided vehicle which realizes accurate arrival and stopping of the automatic guided vehicle at any intended point.

A second object of the invention is to provide a method and apparatus for controlling travel of an automatic guided vehicle which can limit deviations of stop point due to reference-mark detection errors to a minimum possible extent.

A third object of the invention is to provide a method and apparatus for controlling travel of an automatic guided vehicle which realizes accurate stopping of the automatic guided vehicle at any intended point without cumulative error, even when the automatic guided vehicle travels for long distance.

A fourth object of the invention is to provide a method and apparatus for controlling travel of an automatic guided vehicle, which is not influenced by any obstacles on the route, or any stain or damage caused to reference marks for control.

The above and further objects and features of the invention will more fully be apparent from the following detailed description with accompanying drawings.

DETAILED DESCRIPTION OF THE INVENTION

Figure 1:
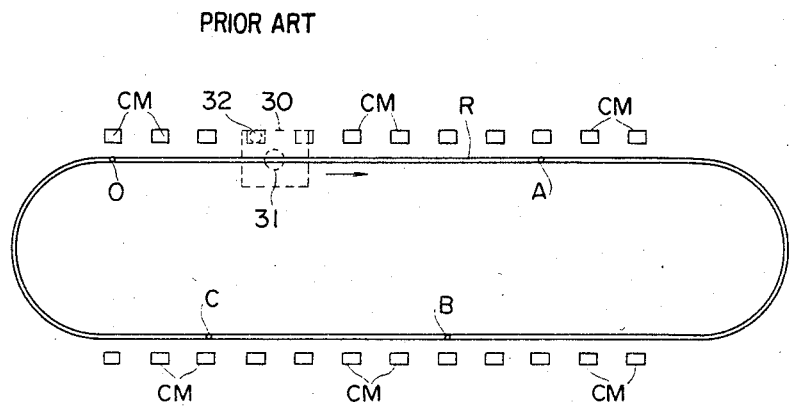
FIG. 1 is a schematic plan view illustrating a conventional method of controlling travel of an automatic guided vehicle.
Figure 2:
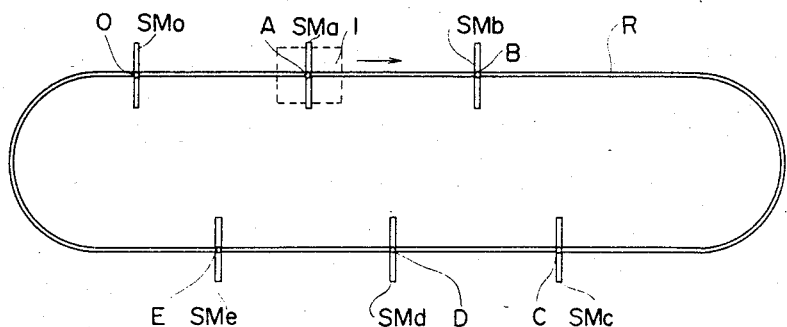
FIG. 2 is a schematic plan view illustrating one mode of carrying out the method according to the invention.

The method and apparatus of the invention will now be described in detail with reference to the accompanying drawings which, except FIG. 1, illustrate one mode of practicing the invention. FIG. 2 is a schematic plan view showing a ground arrangement employed in carrying out the invention. In the figure, R designates an optical reflective tape which forms a route; SMa, SMb . . . SMe designate station marks disposed at predetermined points or stations A, B . . . E, and numeral 1 designates an automatic guided vehicle (hereinafter referred to as "AGV"). The route is set up by fixedly laying the optical reflective tape R on the floor in a loop pattern so that a start point O is connected to predetermined points A, B . . . in order. It is noted in this connection that optical reflective tapes are not the only means available for setting up a route; other known materials such as magnetic tapes and the like may be suitably employed as well. Needless to say, formation of a route is not limited to a loop pattern; it may be of such formation as to connect the start point with the predetermined points in a linear pattern.

Station marks SMa, SMb . . . SMe, and SMo are also formed of an optical reflective tape, each having a length equal to or larger than the width of the AGV 1. They are fixedly set on the floor at the predetermined points A, B . . . and start point O respectively so that each of them, at the center of its length, intersects the route. It is noted that the station marks SMa . . . are individually placed over and across the route reflective tape R as the route so as to prevent the latter from peeling off. The AGV 1 travels from the start point O in the direction of the arrow along the route, thereafter stops selectively at the predetermined points A, B . . . , and returns to the start point O, which process is repeated on a cyclic basis.

Figure 4:
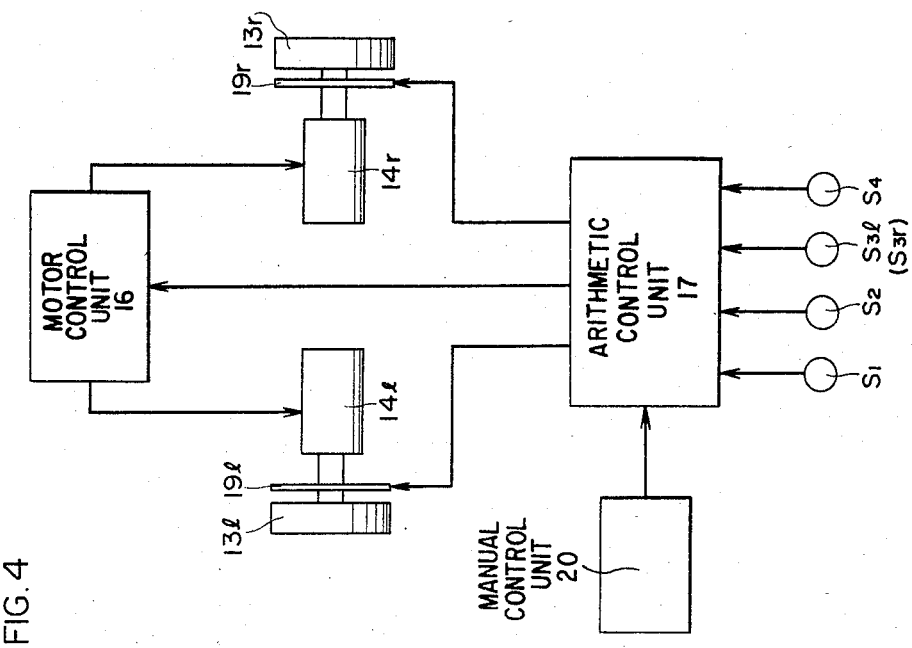
FIG. 4 is a block diagram showing a control system thereof.
Figure 3:
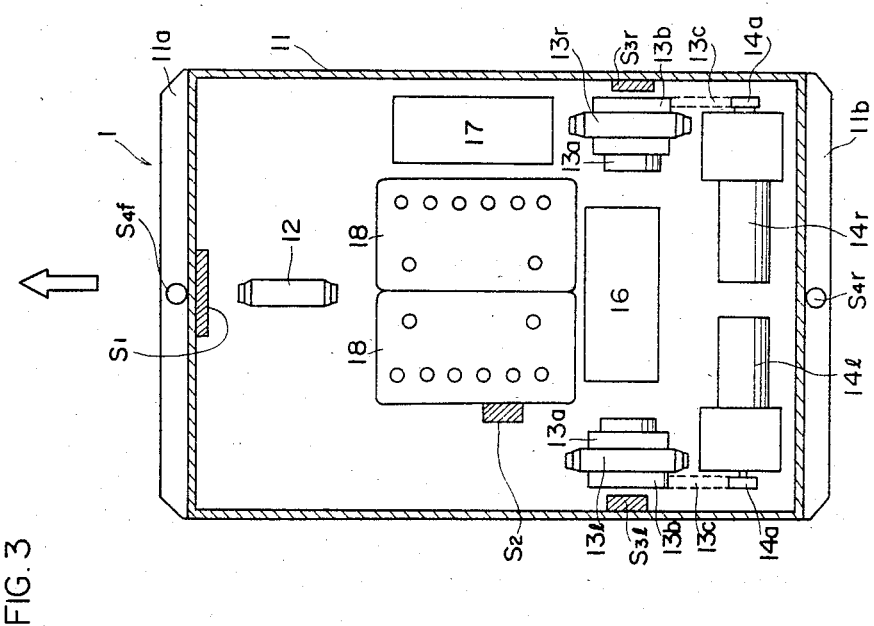
FIG. 3 is a schematic plan view illustrating the arrangement of an automatic guided vehicle employed in carrying out the method of the invention.

FIG. 3 is a schematic plan view illustrating the AGV 1, and FIG. 4 is a block diagram showing an apparatus of the invention. Shown by numeral 11 is a vehicle body, which carries a front wheel 12 and rear wheels 13l, 13r. The front wheel 12 is rotatably supported by a caster frame pivotally supported for rotation around a vertical shaft displaced centrally on the front bottom of the body 11. The rear wheels 13l, 13r are disposed on the rear portion of the bottom of the body 11 and adjacent both sides thereof, being supported by bearings 13a, 13a. Integrally with the rear wheels 13l, 13r and in coaxial relation therewith are there provided toothed pulleys 13b, 13b, which are individually connected through toothed belts 13c, 13c to toothed pulleys 14a, 14a provided on output shafts of motors 14l, 14r having reduction gears. Numeral 16 designates a control unit for the motors 14l, 14r; 17 designates an arithmetic control unit for the AGV 1; and 18 designates batteries.

On the underside of the body 11 and in front of the front wheel 12 there is disposed a steering sensor $S_1$ for tracing the optical reflective tape R as the route. Also on the underside of the body 11 are there provided the following sensors: sensor $S_2$ for detecting station marks SMa, SMb . . . and for deceleration control, which is disposed at a location intermediate between the front and rear ends; sensors $S_3l$, $S_3r$ for detecting station marks SMa, SMb . . . and for stopping the AGV 1, which are disposed close to the side edges of the body 11 and in opposed relation to the respective axile ends of the rear wheels 13l, 13r; and bumper sensors $S_4f$, $S_4r$ for stopping the AGV 1 upon its collision with an obstacle, which are respectively disposed at the front and rear ends of the body 11.

The steering sensor $S_1$ is comprised of optical element laterally aligned at a center location adjacent the front bottom end of the body 11 for detecting reflected light from the optical reflective tape R and is adapted to output a signal corresponding to the intensity of reflected light from the optical reflective tape R to the motor control unit 16 so as to make the unit 16 control the rotational speed of the motors 14l, 14r respectively for eliminating widthwise center deviations, if any, of the body 11 relative to the widthwise center of the optical reflective tape R.

The sensor $S_2$ for deceleration control is likewise comprised of optical elements. When it detects a station mark, the sensor $S_2$ outputs a signal to the arithmetic control unit 17 so as to enable the arithmetic control unit 17 to transmit a deceleration control signal to the motors 14l, 14r through the control unit 16. Comprised of optical elements, the sensors $S_3l$, $S_3r$ output detection signals to the arithmetic control unit 17 when they detect any of the station marks SMa, SMb . . . , so that power supply to the both motors 14l, 14r are stopped through the control unit 16; concurrently, the arithmetic control unit 17 sends a signal to brakes 19l, 19r to stop the rotation of rear wheels 13l, 13r. Bumper sensors $S_4f$, $S_4r$, comprised of switches, are attached to bumpers 11a, 11b mounted to the front and rear ends of the body 11. They are normally in off-condition, but when the AGV 1 strikes against any obstacle, they are turned on to output signals to the arithmetic control unit 17, whereby the arithmetic control unit 17 stops power supply to the both motors 14l, 14r through the control unit 16 and transmits a control signal directly to the brakes 19l, 19r for braking action.

Shown by 20 is a manual control unit which is available for changeover of the mode of AGV 1 travel from auto mode to manual mode, or vice versa. It can also be employed in setting the number of station marks SMa, SMb . . . for the AGV 1 to pass on its way from the start point O to each of the predetermined points A, B, C . . . For example, if the AGV 1 is travelled to predetermined point A, the number of station marks involved is one, except the start-point station mark SMo, and if the AGV 1 is travelled to predetermined point C, the number of station marks involved is three; and numeric values counted in such a way are set into counters $N_1$, $N_3$, $N_4$ associated with sensors $S_2$, $S_3l$, $S_3r$ respectively.

Figure 5:
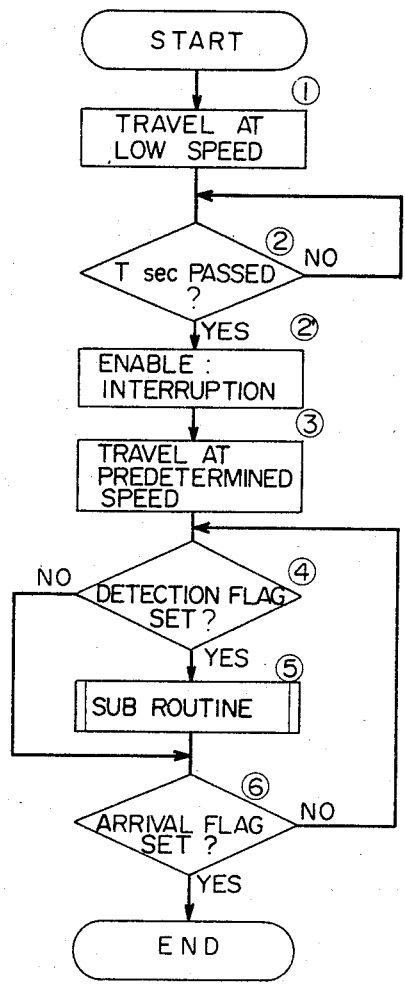
FIGS. 5, 6 and 7 are flow charts illustrating control procedure.
Figure 6:
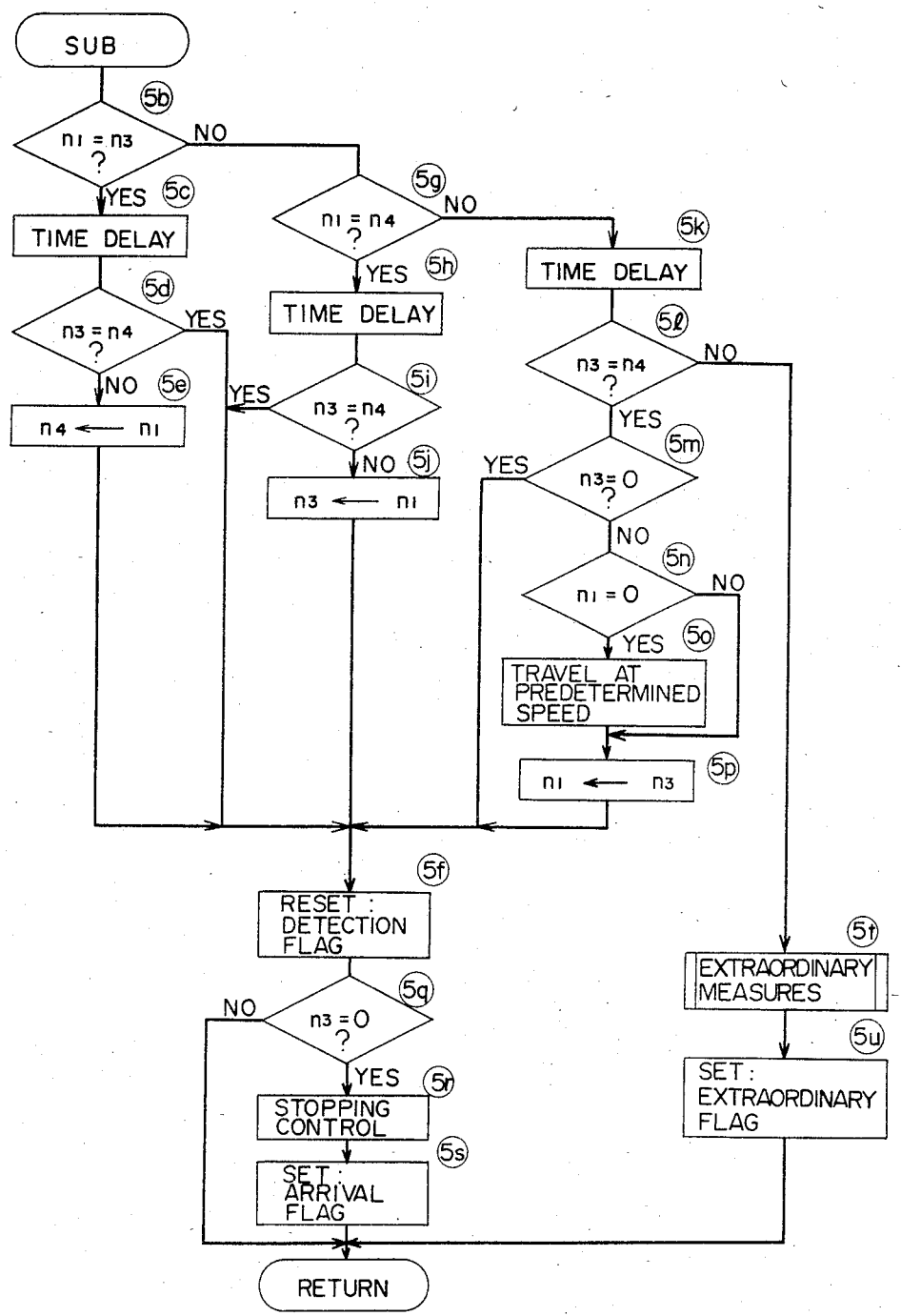
Figure 7:
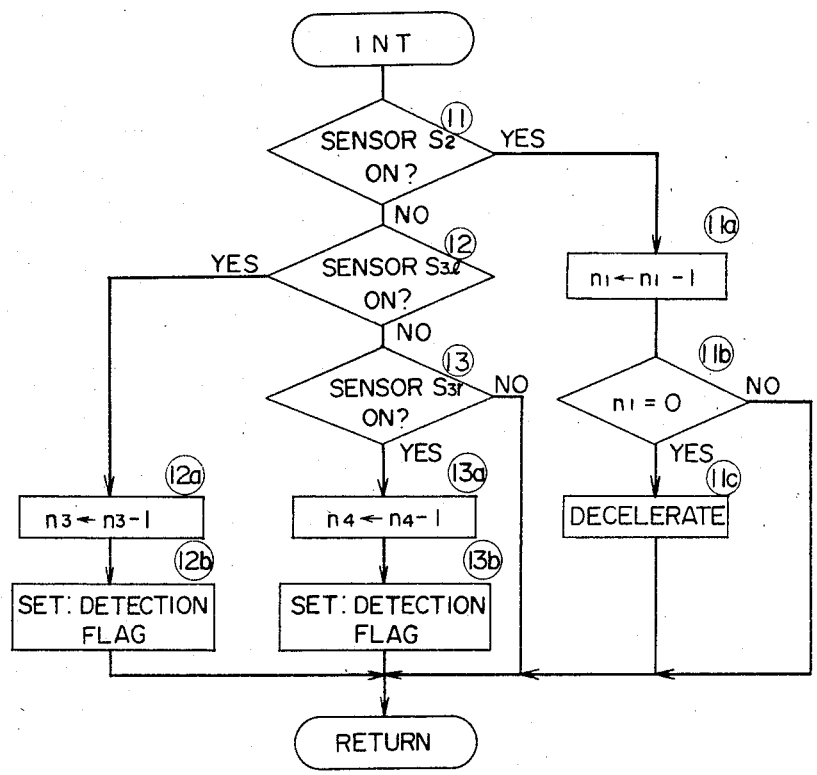

Nextly, such process of travel control of AGV 1 will be explained in conjunction with the flow charts shown in FIGS. 5~7. The number of station marks which the AGV 1 is to pass on its way to predetermined point C, for example, (3 in the instance of FIG. 2) is first input through the manual control unit 20, and with the AGV 1 positioned at start point O so as to be ready for travel on the route in the forward direction, a mode changeover switch (not shown) at the manual control unit 20 is set to auto-mode position, then start-button is operated. Thereupon, the motors 14l, 14r starts rotation at low speed and accordingly the AGV 1 starts at low speed (step ①). When a predetermined time (T sec) has passed after start of AGV 1 (step ②), sensors $S_2$, $S_3l$, $S_3r$ are enabled to interrupt in their operating state (step ②'). Thereafter, interruption routine shown in FIG. 7 is possible. Thus, the arithmetic control unit 17 outputs control signals to the control unit 16 in order to accelerate the motors 14l, 14r, whereby the AGV 1 is made begin constant speed travel at a predetermined speed (step ③). If a detection flag has been set as a result of interruption routine shown in FIG. 7, after the process of step ④ to step ⑤ or a subroutine shown in FIG. 6 is followed, decision is made as to whether or not an arrival flag has been set (step ⑥). If the result is "YES", that is, an arrival flag has been set, the AGV 1 is caused to stop, whereupon a control cycle is completed. If the result is "NO", that is, an arrival flag has not been set, interruption routine shown in FIG. 7 is waited for completion. Referring to the interruption routine shown in FIG. 7, it is noted that if sensors $S_3l$, $S_3r$ detect station marks SMa . . . , that is, if, in the instance of FIG. 2 wherein the AGV 1, in its travel from start point O to predetermined point C, has to pass three station marks, except station mark SMo (at step ②', start of operation of sensors $S_3r$, $S_3l$ is delayed for time T sec in the neighborhood of start point O), any one of the sensors $S_2$, $S_3l$, $S_3r$ detects a station mark, said sub-routine of interruption is carried out.

It is further noted in this connection that if the AGV 1 maintains normal travel condition, sensor $S_2$ first detects a station mark and thereafter sensors $S_3l$, $S_3r$ detect the station mark almost simultaneously. For example, however, if the position of the AGV 1 is not parallel to the route, or if the AGV 1 is out of position on the route, or if some partial stain is present on a station mark, sensors $S_3l$ and $S_3r$ may detect the station mark simultaneously before sensor $S_2$ so does, or one of the sensors $S_3l$, $S_3r$ may detect the station mark. The sub-routine of interruption shown in FIG. 7 is set up in anticipation of such situation.

In this sub-routine, decision is first made as to whether the deceleration sensor $S_2$ has detected a station mark (step ⑪). If "NO" at step ⑪, then decision is made as to whether stop-control sensor $S_3l$ has detected the station mark (step ⑫). If "NO" at step ⑫, decision is made as to whether another sensor $S_3r$ has detected the station mark (step ⑬). If the sensor $S_2$ has detected the station mark, that is, step ⑪ is "YES", the number $n_1$ (which is 3 in the case where the predetermined point is C) set in counter $N_1$ associated with the sensor $S_2$ is counted down by 1 (step 11a), and then, whether $n_1=0$ or not is determined (step 11b). In case of of "NO" at step 11b, then processing returns to the main routine. If "YES", the arithmetic control unit 17 outputs a control signal to the control unit 16 for deceleration control of the motors 14l, 14r, whereby the AGV 1 is decelerated (step 11c); then processing returns to the main routine. If stop-control sensor $S_3l$ detects the station marks, as is the case with sensor $S_2$, number $n_3$ (which is 3 in the case where the predetermined point is C) set in counter $N_3$ associated with the sensor $S_3l$ is counted down by 1 (step 12a), and then a detection flag is set (step 12b). Again, if another stop-control sensor $S_3r$ detects the station mark, number $n_4$ set in counter $N_4$ associated with the sensor $S_3r$ is counted down by 1 (step 13a), then a detection flag is set (step 13b); and thus processing returns to the main routine.

In step 5, if the numbers of station marks detected by at least two of the sensors $S_2$, $S_3l$ and $S_3r$ are equal, the number is considered to be the correct number of station marks, that is, the reference value; and if the number of station marks detected by the remaining one sensor is different from said reference value, the number detected by said one sensor is corrected accordingly. As FIG. 6 shows, this process is repeated each time either one of the sensors $S_3l$, $S_3r$ detects a station mark. That is, if stop-control sensors $S_3l$, $S_3r$ detect a station mark (step 12b or step 13b), whether or not a detection flag has been set is first determined (step 4). If "YES", decision is made as to whether the number $n_1$ set in counter $N_1$ associated with sensor $S_2$ and the number $n_3$ set in counter $N_3$ associated with sensor $S_3l$ are even with each other (step 5b). If the result of step 5b is "YES", after a delay time of 0.2~0.3 sec or so (step 5c), it is determined whether the set number $n_3$ in the counter $N_3$ associated with sensor $S_3l$ and the set number $n_4$ in counter $N_4$ associated with sensor $S_3r$ are equal or not (step 5d). If "YES", then a detection flag is reset (step 5f). If "NO", the number $n_4$ set in counter $N_4$ is corrected to the number $n_1$ set in counter $N_1$ (step 5e), and then resetting of detection flag is made (step 5f).

The delay time in aforesaid step 5c has been determined by taking the following case into consideration. For example, if the position of the AGV 1 is inclined relative to the route, some time difference may be involved between detection of a station mark by one of the sensors $S_3l$, $S_3r$ and detection of the mark by the other sensor. Said delay time is taken as a necessary time allowance for detection by said other sensor. Such time difference can be effectively absorbed by the provision of said delay time.

When a decision is made as to whether the numbers $n_1$ and $n_3$ set in counters $N_1$ and $N_3$ respectively are equal or not (step 5b), if the decision is "NO", whether the numbers $n_1$ and $n_4$ set in counters $N_1$ and $N_4$ respectively are even or not is determined (step 5g), while if the decision of step 5g is "YES", after a delay time of 0.2~0.3sec (step 5h), whether the number $n_3$ set in counter $N_3$ associated with sensor $S_3l$ and the number $n_4$ set in counter $N_4$ associated with sensor $S_3r$ are even or not is determined (step 5i). If the decision in step 5i is "YES", then a detection flag is reset (step 5f); and if "NO", the number $n_3$ set in counter $N_3$ is corrected to the number $n_1$ set in counter $N_1$ (step 5j) and thereafter resetting of detection flag is made (step 5f). If the decision made in step 5g above is "NO", that is, the number of station marks detected differs between the sensor $S_2$ and sensors $S_3l$, $S_3r$, after a delay time of 0.2~0.3 sec or so (step 5k) a decision is made as to whether the numbers $n_3$ and $n_4$ set in counters $N_3$ and $N_4$ respectively are even or not (step 5l). If the decision is "YES", whether the number $n_3$ set in counter $N_3$ is zero or not is determined (step 5m). If "YES" in step 5m, a detection flag is reset (step 5f); if "NO", whether the number $n_1$ set in counter $N_1$ is zero or not is determined (step 5n). If "NO" in step 5n, the number $n_1$ set in counter $N_1$ is corrected to the number $n_3$ set in counter $N_3$ (step 5p) thereafter a detection is reset (step 5f). If "YES", after resetting to constant speed travel (step 5o), the number $n_1$ set in counter $N_1$ is corrected to the number $n_3$ set in counter $N_3$ (step 5p) and then resetting of detection flag is made (step 5f).

After the resetting of detection flag in step 5f, a decision is made as to whether the number $n_3$ set in counter $N_3$ is zero or not (step 5q). If the decision is "NO", then the processing returns to main routine. If "YES", the arithmetic control unit 17 transmits a control signal to the control unit 16 for stopping power supply to both motors 14l, 14r and also issues braking signals to brakes 19l, 19r for stopping control (step 5r), and then an arrival flag is set (step 5s). Thereafter, the processing returns to main routine shown in FIG. 5 to proceed to step 6.

If the decision made in step 5l as to whether the numbers $n_3$ and $n_4$ set in counters $N_3$ and $N_4$ respectively are even or not is negative, that is, if the numbers of station marks detected by sensors $S_2$, $S_3l$, $S_3r$ are different, one from another, extraordinary measures such as, for example, stopping of AGV 1 are carried out (step 5t), then an extraordinary flag is set (step 5u). Thereafter, the processing returns to main routine follows for proceeding to step 6.

As above explained, each time a station mark is detected by any one of the two sensors $S_3l$, $S_3r$, the numbers of station marks as detected by the individual sensors $S_2$, $S_3l$, $S_3r$ by that time are compared, and a detected number which represents a majority of numbers detected by three sensors $S_2$, $S_3l$, $S_3r$ is taken as reference value according to majority logic. Further, each time the AGV 1 passes each individual station mark, the process of correcting mismatched numbers, if any, to the reference value is repeated. Thus, when the reference value reaches a preset value, the AGV 1 is caused to stop.

If the numbers of station marks detected by sensors $S_2$, $S_3l$, $S_3r$ are different altogether, such is taken as an out of order and the AGV 1 will be automatically brought to emergency stop, there being thus no runaway possibility.

In the above described embodiment, sensors are shown as three in number, but it is to be understood that the number implies no limitation whatsoever and that sensors may be in any number, provided that they are not less than three.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A method for controlling travel of an automatic guided vehicle to make said automatic guided vehicle travel along a route from a start point and pass by a plurality of points in order and stop at a predetermined point, comprising the steps of:

detecting marks located at said plurality of points by at least three sensors provided on said automatic guided vehicle and counting the number of marks detected, respectively, by each of said sensors;

adopting a number which represents a majority among said counted numbers of marks from each of said sensors as a reference value in accordance with the logic of majority;

correcting any of said counted numbers which does not equal said reference value.

2. An apparatus for controlling travel of an automatic guided vehicle to make said automatic guided vehicle travel along a route from a start point passing by a plurality of points in order and stop at a predetermined point, comprising;

at least three sensors for detecting marks located at said plurality of points;

counter means for counting the number of marks detected respectively by each of said sensors;

arithmetic means for adopting as a reference value a number occurring the majority of times among said counted numbers in accordance with the logic of majority; and comparator means for comparing said reference value with a predetermined value and for providing a signal when such reference equals said predetermined value;

said automatic guided vehicle being caused to stop when said comparator signal is provided occurs.

3. An apparatus for controlling travel of an automatic guided vehicle as set forth in claim 2, wherein one of said sensors is disposed on the front side of said automatic guided vehicle and on the center portion thereof, the other two sensors being disposed on the rear side of said automatic guided vehicle and on each side thereof.

4. An apparatus for controlling travel of an automatic guided vehicle as set forth in claim 3, wherein the counted numbers of marks counted by said counter are corrected when one of said two sensors disposed on the rear side of said automatic guided vehicle detects one of said marks.

5. An apparatus for controlling travel of an automatic guided vehicle as set forth in claim 3, wherein said one sensor disposed on the front side of said automatic guided vehicle is a sensor for deceleration of said automatic guided vehicle, the other two sensors are sensors for stopping said automatic guided vehicle.

* * * * *